United States Patent [19]
Klingel et al.

[11] Patent Number: 5,132,510
[45] Date of Patent: Jul. 21, 1992

[54] LASER MACHINE ASSEMBLY FOR FLOW OF WORKPIECES THERETHROUGH AND METHOD OF USING SAME

[75] Inventors: Hans Klingel, Moeglingen, Fed. Rep. of Germany; Friedrich Kililan, Avon, Conn.

[73] Assignee: Trumpf, Inc., Farmington, Conn.

[21] Appl. No.: 577,475

[22] Filed: Sep. 4, 1990

[51] Int. Cl.$^5$ .............................................. B23K 26/02
[52] U.S. Cl. .......................... 219/121.82; 219/121.83; 219/121.84; 364/474.08
[58] Field of Search ...................... 219/121.68, 121.69, 219/121.82, 121.83, 121.84; 364/474.08

[56] References Cited

U.S. PATENT DOCUMENTS

4,760,237  7/1988  Mizukado et al. ............. 219/121.82
4,977,512 12/1990  Nakagawa et al. ......... 364/474.08 X Primary Examiner—C. L. Albritton

[57] ABSTRACT

A laser work station has a pair of spaced, parallel extending elongated base members defining a work station therebetween, a laser head support carriage extending between and mounted on the base members for movement along their length, a laser head mounting assembly on the laser support carriage movable therealong between the base members, and a laser head on the mounting assembly for movement vertically relative to the support carriage, so that the laser head is movable in X, Y and Z axes. At least one cart is movable in a path from a point of entry at one end of the base members to the opposite end thereof, and cart positioning elements locate the cart in a predetermined position between the base members. A guidance system is connected to the several movable elements to effect precision movement of the laser head over the workpiece supported on the cart(s) over substantially the entire length of the movement of the laser head support carriage, and fume may be withdrawn through one of the base members.

39 Claims, 8 Drawing Sheets

LASER MACHINE ASSEMBLY FOR FLOW OF WORKPIECES THERETHROUGH AND METHOD OF USING SAME

BACKGROUND OF THE INVENTION

The present invention relates to laser work stations and, more specifically, to a laser work station in which a cart supports a workpiece therewithin.

Laser work stations are now widely employed for cutting and welding various types of parts. Generally, in the processing of sheet metal workpieces, the workpiece may be supported upon a worktable and moved by a clamping and guidance system about the table relative to a laser head at a fixed work station, or the laser head may be moved relative to the workpiece. In the latter type of laser work station, it is desirable to be able to effect relative movement of the laser head in X, Y, and Z axes.

In some work stations, the workpieces are loaded onto the support automatically by robots or other loading devices, and in others the workpieces are loaded manually. As will be appreciated, it would be desirable to support the workpiece on a cart or carrier which is moved into the work station and then withdrawn therefrom so as to minimize the handling within the station. Generally, workpiece carts or carriers would not provide efficient means for evacuating the fume which is generated during a laser cutting, or welding operation, and it would be necessary to effect precise alignment of the guidance system with the workpiece supported on the cart. Moreover, a work station using a cart would generally be limited in the length of the workpiece which could accommodated therewithin and also require the cart to be entered and be removed from the same side of the machine.

It is an object of the present invention to provide a novel laser work station in which the workpiece is supported upon one or more carts which are moved within the work station and which may be positioned reasonably accurately within the work station so as to facilitate operation thereon by the laser head under the control of the guidance system.

It is also an object to provide such a laser work station in which fume may be withdrawn efficiently from the work station during the laser operation.

Another object is to provide such a laser work station in which the workpiece may be advanced in the work station on supporting carts and the guidance system may compensate accurately for any shifting of the workpiece which has been so moved.

SUMMARY OF THE INVENTION

It has now been found that the foregoing and related objects may be readily attained in a laser work station comprising a pair of spaced, parallel extending elongated base members defining a work station therebetween and having opposed side walls. A laser head support carriage extends between, and is mounted on, the base members for movement along the length thereof, and movement means is provided for moving the laser head support carriage along the length of the base members.

A laser head mounting assembly is provided on the laser head support carriage and is movable therealong between the base members, and movement means is provided for moving the laser head mounting assembly along the laser head support carriage. A laser head is supported on the mounting assembly for movement vertically relative to the support carriage, and movement means is provided for moving the laser head vertically. As a result, the laser head is movable vertically (Z axis), is movable along the laser head support carriage (Y axis), and is movable with the laser head support along the base members (X axis).

At least one cart is movable in a path parallel to the base members from a point of entry end of the base members to a point of exit at the opposite end thereof, although the cart may also be withdrawn from the side providing the point of entry. Guide means is provided to guide the cart along a parallel path between the base members. The cart has a workpiece supporting surface on the top thereof, and cart positioning means is provided along the path for locating the cart in a predetermined position between the base members. A guidance system connected to the several movement means for the laser head support carriage, mounting assembly and laser. head for effecting precision movement of the laser head in the X, Y and Z axes to permit the laser head to direct a laser beam onto an associated workpiece supported on the cart over substantially the entire length of the movement of the laser head support carriage.

Preferably, the guide means comprises a pair of spaced tracks or rails extending through the laser work station, and the cart has wheels movable on the tracks or rails. The cart positioning means includes a first positioning element on the cart and a second positioning element at a fixed location along the length of the base members. The first and second positioning elements cooperate to position the cart at a predetermined point. Desirably, one of the positioning elements includes a cam surface and the other of the positioning elements includes a cam follower. The cam surface includes a positioning recess in which the cam follower will seat in the predetermined position, and the other element includes means for releasably locking the cam follower in the recess. The cam surface extends in a generally horizontal direction, and the cam follower is provided at the upper end of a vertically disposed, double acting piston; and the releasable locking means is operable to hold the piston in the recess.

In the preferred embodiment, one of the base members has at least one port along its opposed side wall adjacent the cart in the predetermined position, and suction means for drawing air through the port. The cart has a base wall and side walls providing an upwardly open chamber, and the side wall of the cart adjacent the port has a port therein which is aligned with the port in the base member. As a result, air and fume may be drawn from the cart chamber into the base member. The side wall of the cart has sealing means about the port therein for effecting a seal between the side wall of the base member and the side wall of the cart. In the preferred assembly, the base member has a pair of ports therein alignable with ports of a pair of carts disposed in the work station; and the base member includes shutter means for closing off one of the ports and means for opening and closing the shutter.

Preferably, the cart has a removable grid across the top thereof for seating a workpiece, and the cart includes means for securing the grid thereon. Desirably, the cart includes aligning means for positioning the workpiece placed thereon, and one of the side walls of the cart includes a clean out port for removing slag from the chamber.

To enable stable engagement and positioning of a pair of carts in front to rear relationship, the cart has first engaging means at its forward end and second engaging means at its rearward end, and these engaging means are cooperatively configured and dimensioned. Desirably, the laser head support carriage includes a depending positioning element engageable with a cooperating element on the cart whereby the carriage will move with the cart from one position to another within the work station to facilitate realignment of the guidance system relative to the workpiece when it is moved within the work station. Preferably, the work station includes position detecting means on the laser head operable, to detect reference points on a workpiece moved by the cart in the work station to effect precise realignment of the guidance system based upon position of the reference points following such movement.

In addition, the work station includes a computer for controlling the movement means and the guidance system.

DETAILED DESCRIPTION OF THE PREFERRED EMBODIMENT

Figure 1:
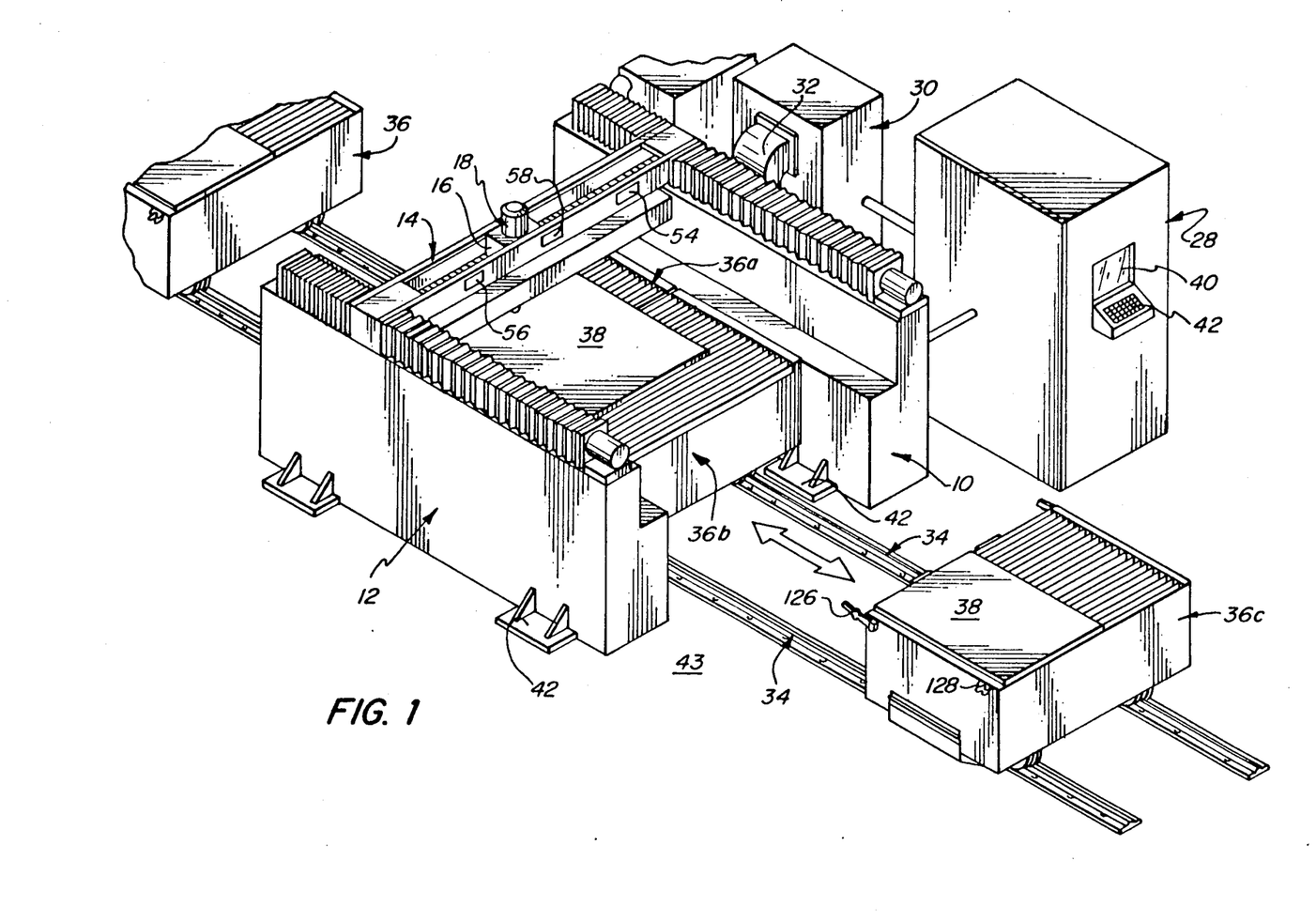
FIG. 1 is a fragmentary perspective view of a laser work station embodying the present invention showing fragmentarily a first cart as having passed therethrough, a pair of interlocked carts positioned within the station, and a third cart on the entry side of the work station.
Figure 2:
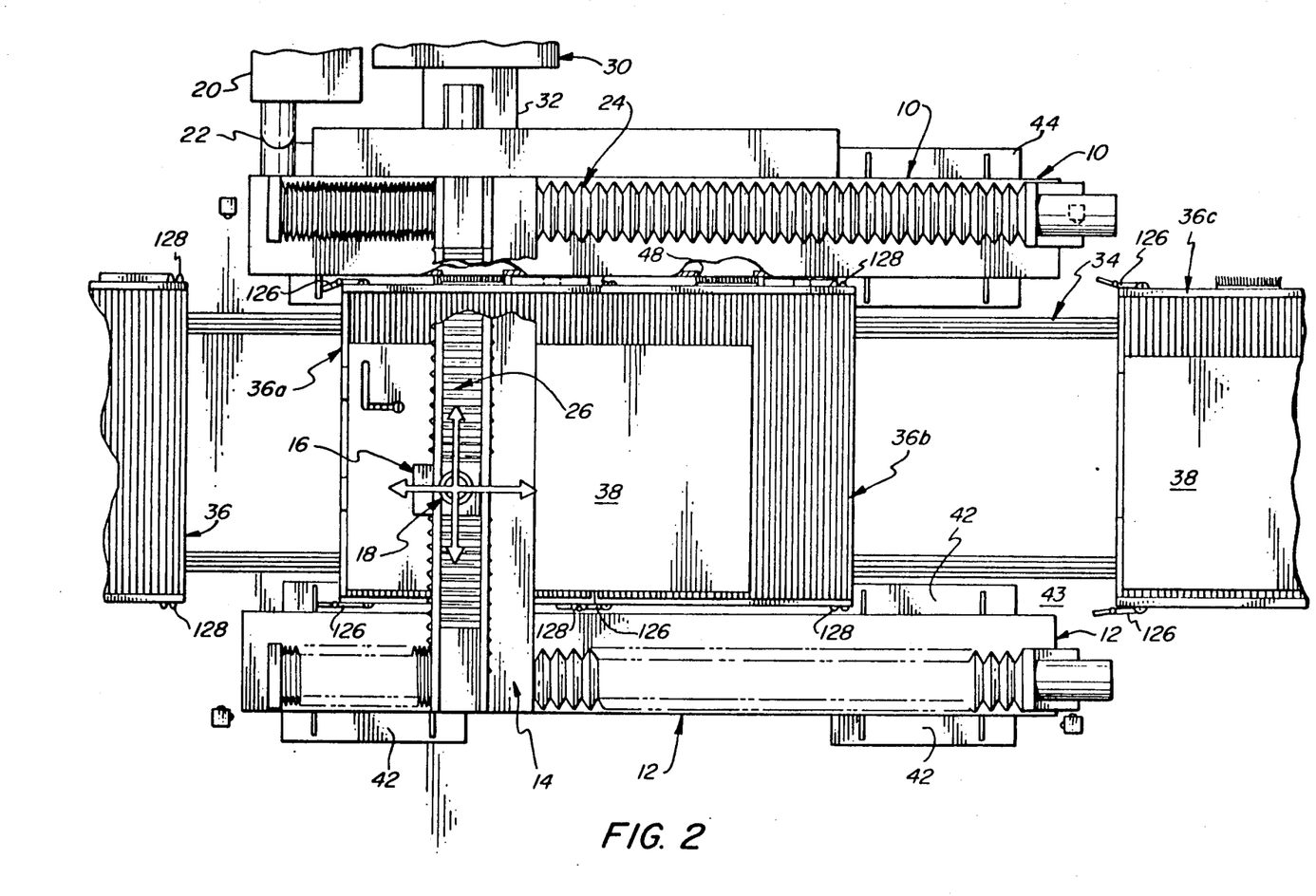
FIG. 2 is a fragmentary top plan view thereof.

Turning first to FIGS. 1 and 2 of the attached drawings, therein illustrated is a laser work station embodying the present invention. A pair of elongated side frames generally designated by the numeral 10, 12 are spaced apart and support thereon a laser head support carriage generally designated by the numeral 14 which supports a laser head mounting assembly generally designated by the numeral 16 that in turn carries the laser head generally designated by the numeral 18.

A laser beam is generated by the laser beam generator 20 and is transmitted to the laser head 18 through the beam delivery tube 22 and the beam bender optics within the carriage drive system generally designated by the numeral 24 and the laser head drive system generally designated by the numeral 26. Operation of the laser beam generator 20 is under the control of the computer control unit 28, and fume generated by the operation is exhausted from the work station through the fume exhaust system generally designated by the numeral 30 and connected to the side frame 10 through the duct 32.

Extending through the laser work station are a pair of tracks or rails generally designated by the numeral 34 on which are mounted carts generally designated by the numeral 36 which support workpieces thereon generally designated by the numeral 38.

As seen in FIG. 1, the control unit 28 includes a CRT display 40 and a keyboard 42.

Figure 10:
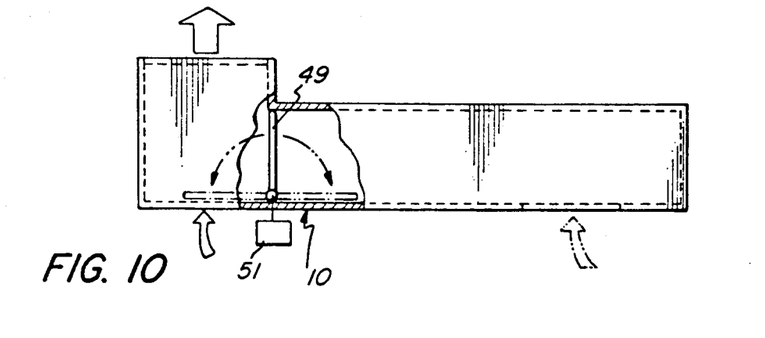
FIG. 10 is a schematic plan view of the base member in partial section showing a shutter for sealing the interior.
Figures 11, 12:
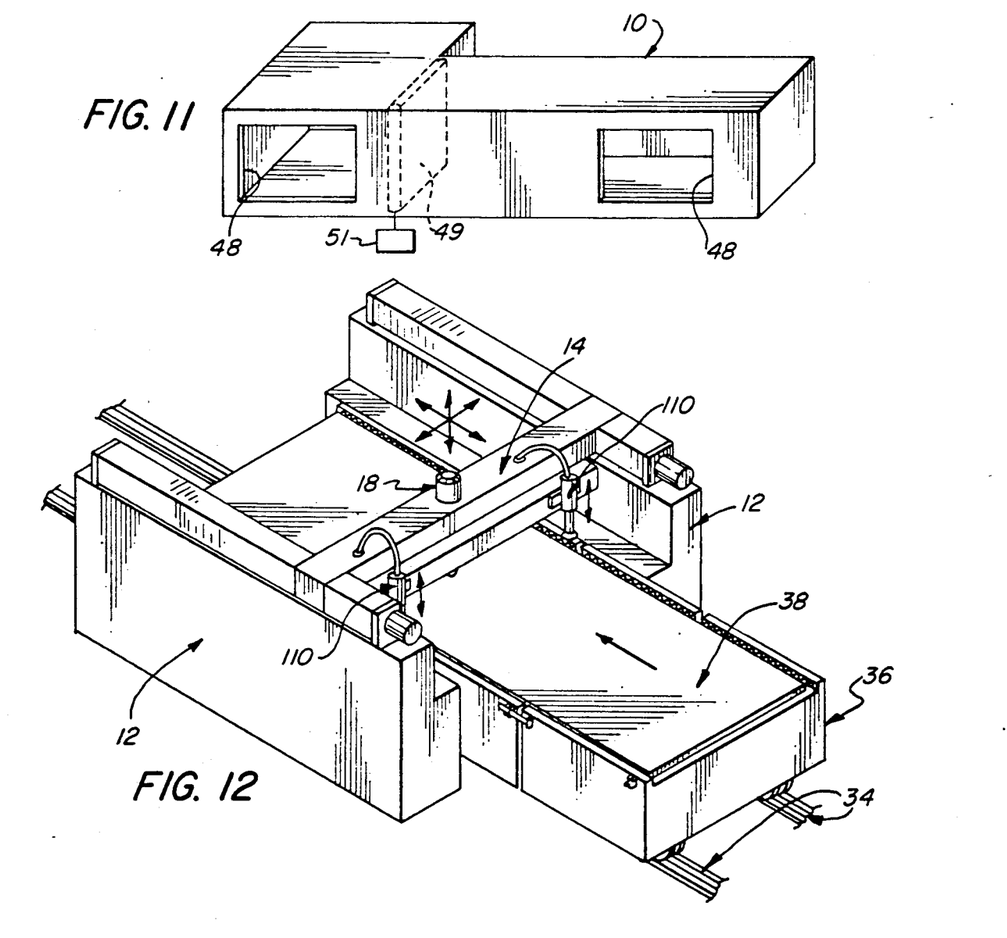
FIG. 11 is a schematic perspective view of the base member showing the pair of exhaust ports and the shutter in a position closing the rearward port.
FIG. 12 is a fragmentary perspective view of the work station showing a positioning member on the laser head support carriage engaged with a cart for concurrent movement therewith along the path through the work station.

As seen in FIGS. 1-3 and FIGS. 8-11, the side frames 10, 12 are securely fastened to a monolithic slab 43 by the mounting pads 44. The side wall 46 of the frame 10 has a pair of ports 48 spaced along its length, and it includes a positioning assembly generally designated by the numeral 50 which will be described more fully hereinafter. Within the side frame 10 is a pivotally mounted shutter 108 which is seen in FIGS. 10 and 11 to close the passage therethrough, thus confining the suction action to the front port 48. A pneumatic activator 51 will move the shutter 108 in either direction of pivotal movement to close the front port 48 or to open both ports to suction action.

Extending along the upper surfaces of the side frames is the carriage drive system 24 which includes a bellows 52 to expand and contract as the laser head carriage 14 moves from one end thereof to the other in response to the drive action of the drive mechanism 54, which is diagrammatically illustrated in FIG. 1. As is known, such drive mechanisms generally employ rack and pinion mechanisms to enable precise positioning.

Similarly, the laser head mounting assembly 16 is movable transversely of the work station by a similar rack and pinion mechanism under operational control the drive mechanism 56 which is diagrammatically illustrated in FIG. 1. Lastly, the laser head 18 may be moved vertically by a belt drive system operated by the drive mechanism 58 which is diagrammatically illustrated in FIG. 3.

These drive mechanisms are generally known to persons skilled in this art and therefore are not described in greater detail.

Figure 3:
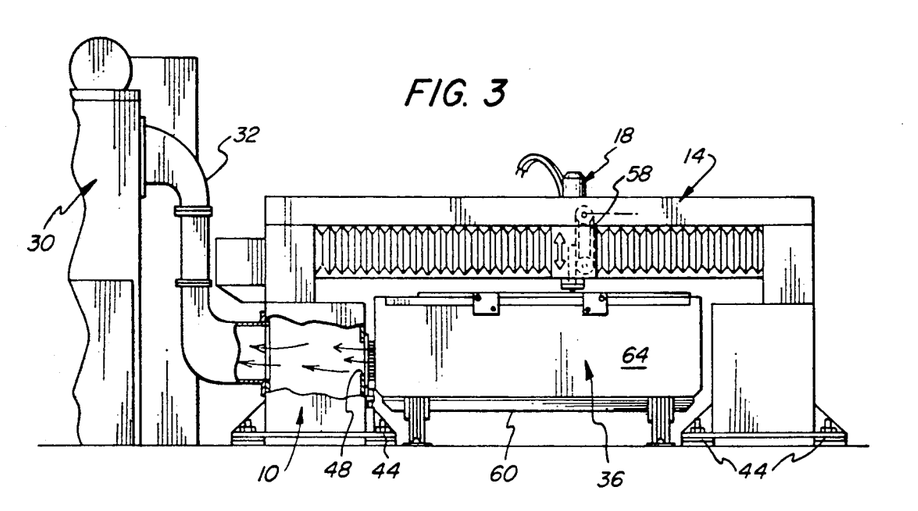
FIG. 3 is a fragmentary rear elevational view of the work station with the laser beam generator omitted to illustrate other structure and with portion in partial section to show the exhaustion of fume from the cart through the base member.
Figure 4:
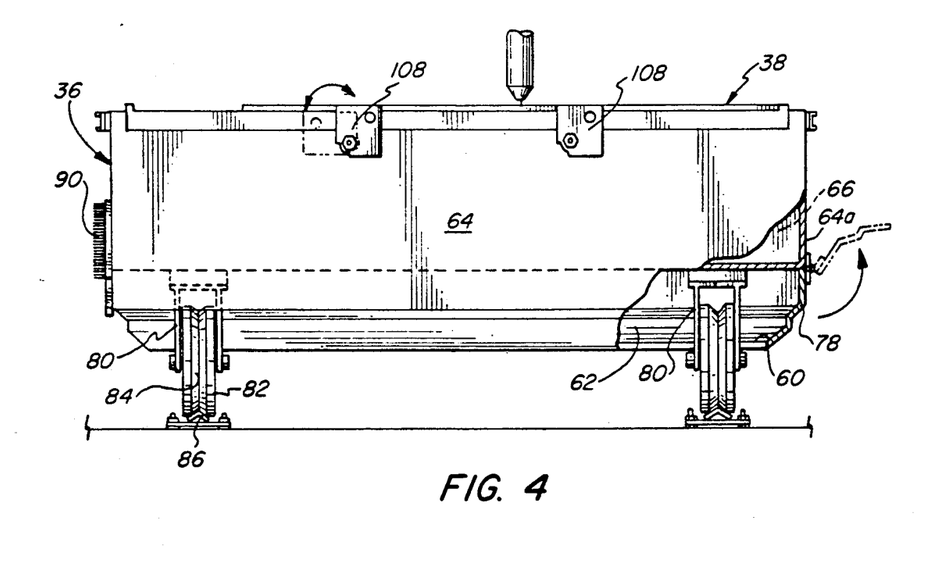
FIG. 4 is an enlarged elevational view of the front end of a cart with a workpiece mounted thereon and showing fragmentarily the laser head as positioned thereabove, a portion of the cart being in partial section to reveal internal structure and showing in phantom line the cleanout port in the open position.
Figure 5:
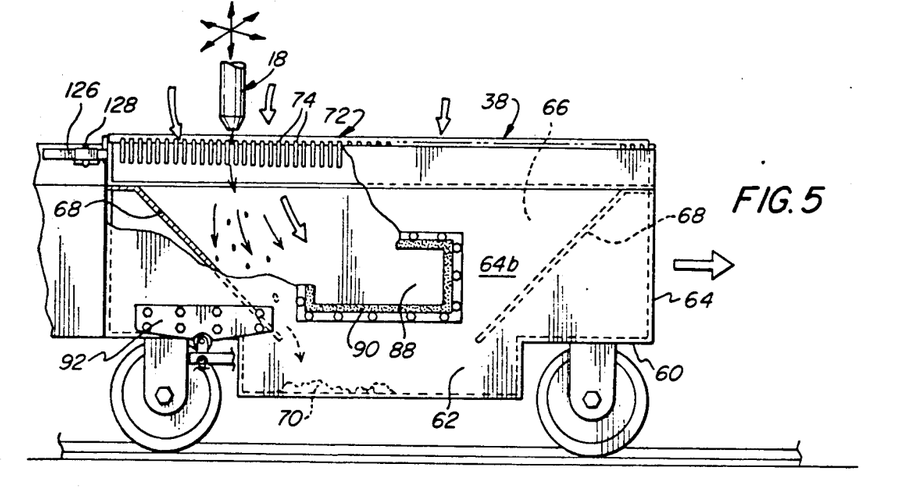
FIG. 5 is a fragmentary side elevational view of the pair of assembled carts in FIGS. 1 and 2 in partial section to reveal internal structure and diagrammatically showing the flow of slag and fume into the cart, and the laser head disposed thereabove.

Turning now in detail to FIGS. 3 through 8, the cart 36 has a base wall 60 with a depending portion providing a hopper 62, and the base wall 60 and four side walls 64 together define an upwardly opening chamber 66. Within the chamber 66 are inclined baffles 68 upon which slag 70 from the laser operation may fall and along which the slag 70 will slide into the hopper 62 as seen in FIG. 5.

Disposed on the upper surface of the cart 36 is a grid member generally designated by the numeral 72 and comprised of a multiplicity of spaced transversely extending slats 74 of substantially greater height than thickness. At least at one end the slats 74 have vertical shoulders 76 to facilitate positioning the workpiece 38 thereagainst. As seen in FIG. 4, pivotable stops 108 are provided on the side wall 64 at the front of the cart 36 and position the leading edge of the 38.

One side wall 64a of the cart has a clean out port 78 through which slag 70 may be removed from the hopper 62 as shown in FIG. 4.

To engage two or more carts in front to rear assembly, the front end of the cart 36 is provided on each side with forwardly projecting latch arms 126 which releasably engage in the latch receptacles 128 at the rear ends of the carts.

Mounted on the base wall 60 adjacent the front and rear ends of the cart 36 are wheel support members 80 in which are rotatably journalled the wheels 82 which have a groove 84 extending about their periphery. As seen, this groove 84 receives the upstanding inverted V-shaped rib 86 provided by an angle iron in the tracks or rails 34.

In the side wall 64b of the cart 36 opposite the clean out port 78 is a port 88 with a sealing element 90 extending thereabout to make an effective seal with the side wall 46 of the frame 10 when it is positioned thereagainst. As seen in FIG. 3, fume is exhausted through the port 88 of the cart 36, the port 48 in the side frame 10, and the duct 32 into the fume exhaust system 30.

Figure 6:
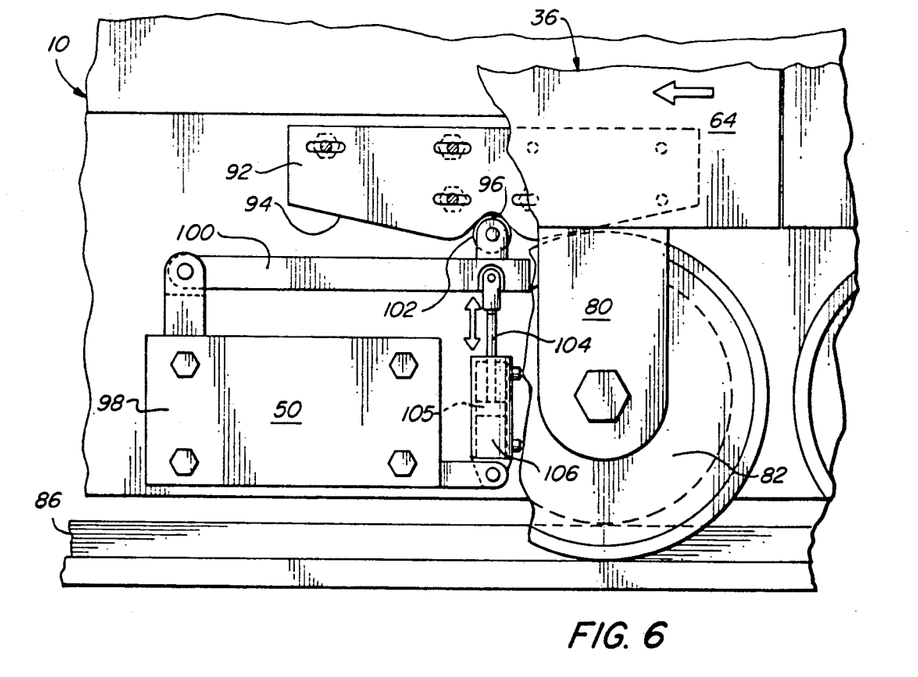
FIG. 6 is a fragmentary side elevational view to an enlarged scale of the cart and the base member showing the cooperating positioning elements.
Figure 7:
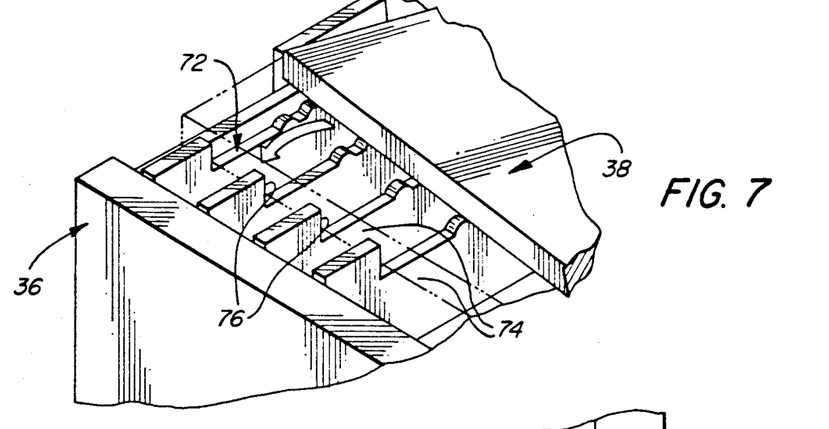
FIG. 7 is a fragmentary perspective view of a cart showing the grid structure, and further showing the workpiece in phantom line in its normal position and in solid line in a skewed position to expose the structure of the grid.
Figure 8:
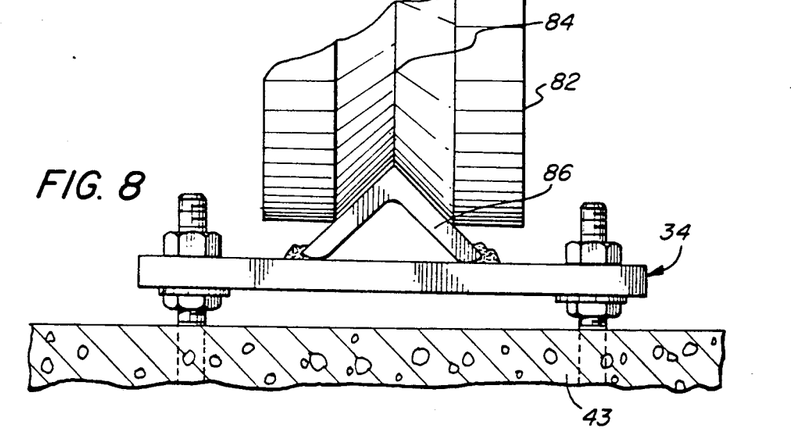
FIG. 8 is a fragmentary front elevational view to an enlarged scale of a wheel of the cart as disposed upon one of the guide rails.
Figure 9:
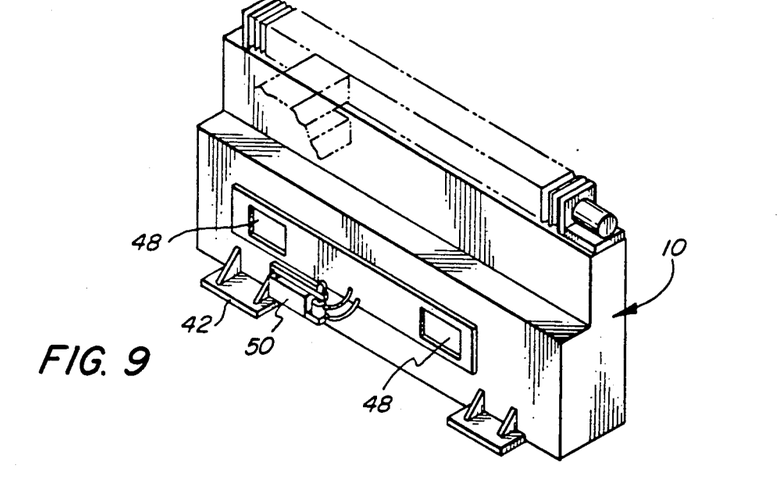
FIG. 9 is a perspective view of the base member having the fume removal system and fragmentarily illustrating the support carriage for the laser head and the movement mechanism and beam transport.

Also on this side wall 64b of the cart 36 is a positioning plate 92 best seen in FIGS. 5 and 6 which provides a cam surface 94 along its lower edge, and the cam surface 94 has a centrally disposed upwardly extending recess 96.

The positioning assembly 50 on the side frame 10 is also illustrated in FIG. 6 and can be seen to include a mounting member 98 upon which is pivotally mounted one end of the lever 100 which carries an upstanding cam roller 102 adjacent its free end. Also mounted on the mounting member 98 is an upstanding double acting piston 104 which has its upper end connected to the lever 100 so as to effect its movement upwardly and downwardly in response to pneumatic pressure on either side of the piston head 105 disposed within the cylinder 106.

Figure 13:
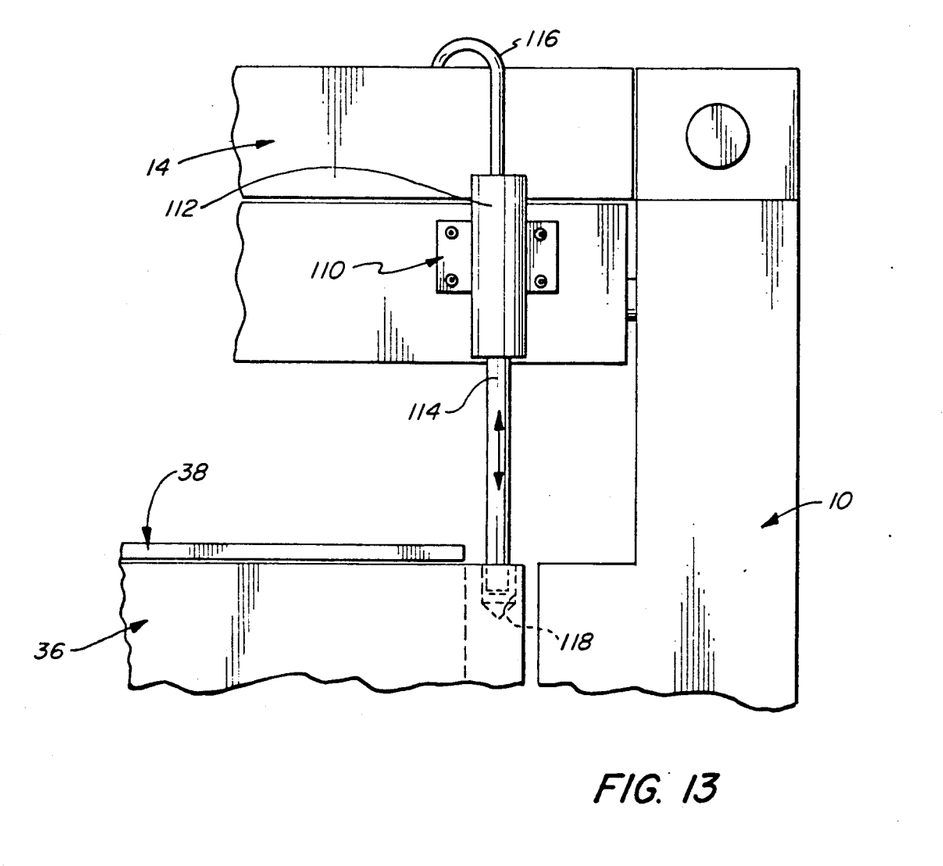
FIG. 13 is a fragmentary front elevational of the work station seen in FIG. 12 drawn to an enlarged scale.

Turning now to FIGS. 12 and 13, a preferred form of the apparatus has repositioning assemblies generally designated by the numeral 110 mounted on the laser head support carriage 14. Each of the repositioning assemblies 110 can be seen in FIG. 13 to include a cylinder 112 which is pneumatically actuated by pneumatic pressure through the conduit 116 to move the piston 114 upwardly and downwardly. In its downward position, the piston 114 extends into a recess 118 in the upper surface of the cart 36 adjacent its rearward end so that the laser support carriage 14 may be indexed with the workpiece 38 to a new position within the work station as will be described more fully hereinafter.

Figure 14:
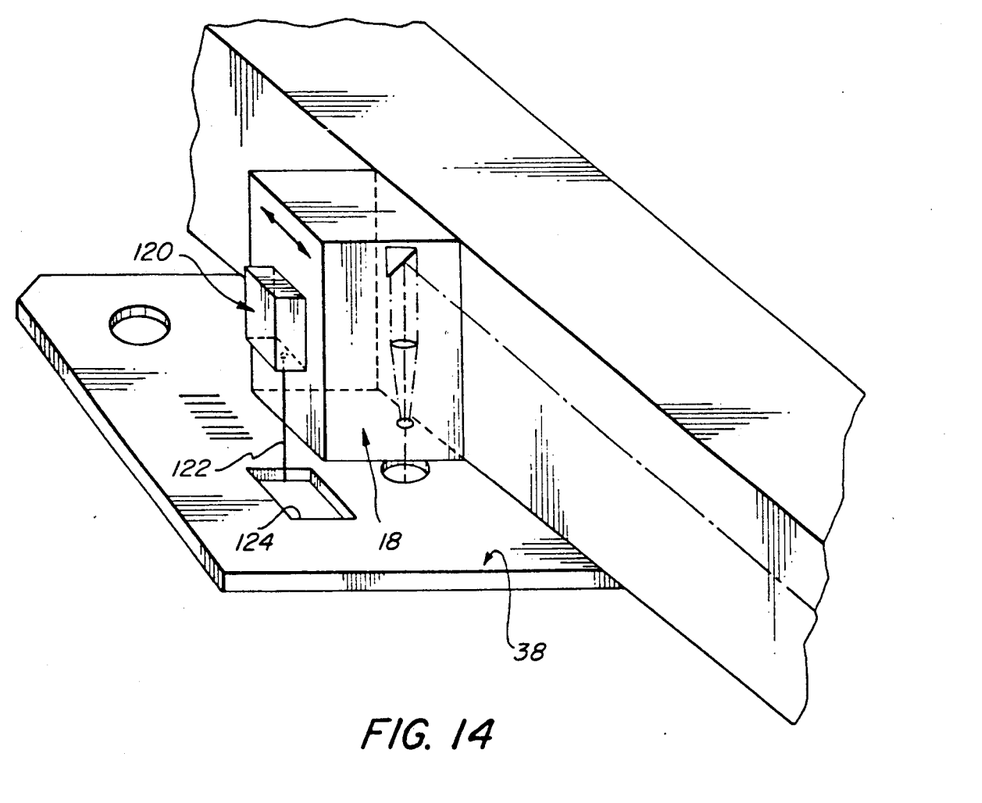
FIG. 14 is a fragmentary diagrammatical view of the laser head with a positioning probe sensing the contour and location of a positioning cutout in the workpiece which has been indexed in the work station.

Turning now to FIG. 14, therein illustrated is a workpiece position sensing assembly generally designated by the numeral 120 which is desirably included to permit precise realignment of the coordinates of the guidance system relative to the workpiece 38 after it has been indexed forwardly within the work station. The assembly 120 is diagrammatically shown as mounted upon the side of the laser head 18 so that it moves upwardly and downwardly therewith. As seen, the assembly 120 includes a depending sensor 122 which will extend below the upper surface of the workpiece 38 when the laser head 18 is moved downwardly, and it may be moved about the workpiece 38 in reference cutouts 124 or along its edge by the guidance system to enable accurate determination of the orientation of the workpiece 38 upon the cart 36 and recalibration of the guidance system, as will be discussed more fully hereinafter.

In operation of the laser work station, the workpiece 38 is placed upon one or more carts 36 depending upon its length. If two or more carts are employed, then the carts are locked together by the latch mechanisms 126,128. The carts 36 with the workpiece 38 thereon are then moved along the tracks or rails 34 until the positioning plate 92 on the side of the forward cart 36a moves into alignment with the cam roller 102 at which time the cylinder 106 is actuated and the piston 104 is driven upwardly into locking engagement within the recess 96 to position the cart 36.

At this point, the guidance system of the work station is operated by the computer control unit 28, and it may use the position sensing assembly 120 to determine precisely the forward edge and side edges of the workpiece 38 for compensation of the guidance system, or the guidance system may simply index a short distance inwardly from the known dimensions of the workpiece 38 to begin its cutting or other operation. Electrical signals generated by the computer program in the computer control unit 28 cause the motors 54 and 56 to move the carriage 14 along the length of the workpiece 38 and across its width of the workpiece as is conventional in such work stations. In addition, the motor 58 is operative to move the laser head 18 upwardly and downwardly relative to the workpiece to achieve the desired focusing of the laser beam on the workpiece. In this fashion, a workpiece occupying the full length of the workstation may be processed in accordance with the computer program stored in the computer control 28.

During the laser operation, cutting action will produce slag and fume with the slag 70 falling downwardly onto the baffles 68 and into the hopper 62. The vacuum being drawn through the side frame 10 by the fume exhaust system 30 will exhaust fume and hot air through the port 88 of the cart 36, and port 48, and the fume then passes through suitable fume handling equipment (not shown).

If the workpiece 38 is of a length to be fully processed without repositioning at completion of the processing, the piston 104 is driven downwardly to release the carts 36 which can be withdrawn on the rails 34 from either end of the work station.

In the event that the workpiece 38 is of greater length than the effective length of the work station, it may be carried upon additional carts 38 which are interlocked. After the initial length of the workpiece 38 has been processed, the cylinder 106 is actuated to release the piston 104 from the recess 96 in the positioning plate, and the repositioning assembly 110 on the carriage 14 is moved downwardly into engagement within the recess 118 in the rear end of the rearward cart 36b within the work station. The carts are then moved forwardly until the cart 36c which is rearwardly of the repositioning assembly 110 moves forwardly until the cam roller 102 engages within the recess 96 of its positioning plate 92. At this point the repositioning assembly 110 is disengaged and the carriage 14 is located adjacent the forward end of the cart 36c.

Although it is possible to rely upon the accuracy of movement of the carts 36 within the work station, particularly if a continuous contour is not being cut from the work piece, generally it is desirable to utilize the position sensing assembly 120 to sense one or more reference positions 124 at the rearward end of the workpiece 38 which has already been processed to determine a new $X^0$, $Y^0$ coordinate position for the guidance system and the further processing of the workpiece. This will compensate for any shifting that may have occurred.

The size of the work station will vary with the size of the workpieces which are to be processed therein. Conveniently, a work station for processing a wide variety of workpieces would enable movement therethrough of carts which are four feet by four feet in size and provide an effective working length for the laser head of slightly less than four feet in width and up to eight feet in length without indexing of the carts therethrough.

As shown in the illustrated embodiment, the carts desirably have a replaceable grid providing the top surface or work support surface to minimize the heating of the cart as a result of the laser beam striking portions of the top surface as it cuts through the workpiece. These grids can be readily replaced. Moreover, the grids are desirably configured to provide a shoulder for abutment of the leading edge of the workpiece thereon to facilitate location by the workpiece guidance system.

In the illustrated embodiment, the carts are provided with a vacuum port on only one side cooperating with a vacuum port in only one side frame. However, if so desired, vacuum systems can be provided in both side frames and ports provided in both side walls of the carts so that vacuum is drawn in both directions.

It is essential to the present invention that the side frames be mounted in a stable and level position on the support surface. Generally, this should be accomplished by pouring a single high strength monolithic slab which may include a vibration damping construction. The side frames are then bolted firmly into precise position upon the slab, and wedges may be used to facilitate leveling.

The assembly also includes means for guiding the carts through the work station so that they may be entered or removed from either side of the station and accurately positioned therewithin. Conveniently, this is effected by using a pair of rails or tracks mounted upon the slab upon which the wheels of the carts will move. However, other systems may be employed such as a separate guide rail on the slab and a follower on the cart, or rails in one or both of the side frames with cooperating followers on the carts. The carts may be moved manually or automatically by machine control, and motorized carts (robots) may be employed if so desired.

As indicated previously, when a longer workpiece is being indexed through the work station, it is extremely desirable that the work station include means for checking the accuracy of positioning of the workpiece after it has been moved forwardly. This enables compensation of the guidance systems to account for any shifting of the sheet, either angularly or rearwardly as a result of the motion. Conveniently, this is effected by providing one or two separate cutouts as a part of the final cutting action on the forward section of the workpiece, or, noting specific contours adjacent the rear end of the cutout in the workpiece which can be probed. Generally, the measuring system will probe at least two or more points to check the position of the workpiece prior to recalibration of the guidance system to compensate for any shifting.

From the foregoing detailed specification and attached drawings, it can be seen that the laser work station of the present invention is one in which the workpiece is supported upon carts which may be moved through the work station in both directions, or removed from the side of entry. The carts may be positioned accurately within the work station so as to facilitate operation thereon by the laser head under control of the guidance system and the computer control. Fume and heated air from the cutting operation may be withdrawn from beneath the workpiece supported on the cart. The workpiece may be accurately moved forwardly through the work station so as to be repositioned therein without loss of accuracy in the guidance system.

Having thus described the invention, what is claimed is:

1. A laser work station comprising:
   (a) a pair of spaced, parallel extending elongated base members defining a work station therebetween, said pair of base members having opposed side walls;
   (b) a laser head support carriage extending between and mounted on said base members for movement along the length thereof;
   (c) movement means for moving said laser head support carriage along the length of said base members;
   (d) a laser head mounting assembly on said laser head support carriage movable therealong between said base members;
   (e) movement means for moving said mounting assembly along said laser head support carriage;
   (f) a laser head mounted on said mounting assembly, said laser head being movable along said laser support carriage (Y axis), and movable with said laser support carriage along said base members (X axis);
   (g) at least one self-supporting cart movable in a path between said base members and parallel thereto from a point of entry of at one end thereof, said cart having a workpiece supporting surface on the top thereof and being readily removable from said work station and movable to a remote position;
   (h) guide means for guiding said cart between said base members and along said parallel path;
   (i) venting means in one of said base members cooperating with said cart to evacuate fume from said cart;
   (j) positioning means on said laser head support carriage engageable with said cart to effect concurrent movement of said support carriage and caret within said work station;

(k) position detecting means on said laser head support carriage operable to detect preselected reference points on a workpiece on said cart;

(l) cart positioning means along said path cooperating with a positioning element on said art for locating said cart in a predetermined position between said base members; and (m) a guidance system connected to said movement means or said laser support and mounting assembly for effecting precision movement of said laser head in said X and Y axes to permit said laser head to direct a laser beam onto an associated workpiece supported on said cart over substantially the entire length of said movement of said laser support carriage, said position detecting means cooperating with said guidance system to effect realignment of said guidance system to reflect the actual position of the reference points on the workpiece.

2. The laser work station in accordance with claim 1 wherein said guide means is disposed between said base members.

3. The laser work station in accordance with claim 2 wherein said guide means comprises a pair of spaced racks extending through said laser work station and wherein said cart has wheels movable on said tracks.

4. The laser work station in accordance with claim 1 wherein said cart positioning means includes a first positioning element on said cart and a second positioning element at a fixed location along the length of said base members, said first and second positioning elements being interchangeable and cooperating to position said cart at a predetermined point along the length of the path between said base members.

5. The laser work station in accordance with claim 4 wherein one of said positioning elements includes a cam surface and the other of said positioning elements includes a cam follower, said cam surface including a positioning recess in which said cam follower will seat in the predetermined position, and said other element including means for releasably locking said cam follower in said recess.

6. The laser work station in accordance with claim 5 wherein said cam surface extends in a generally horizontal direction, wherein said cam follower is provided at the upper end of a vertically disposed, double acting piston, and wherein said releasable locking means is operable to hold said piston in said recess.

7. The laser work station in accordance with claim 1 wherein said venting means in said one of said base members at least one port along its opposed side wall adjacent said cart in said predetermined position and suction means for drawing air through said port, and wherein said cart has a base wall and side walls providing an upwardly open chamber, the side wall of said cart adjacent said port having a port therein aligned therewith, whereby air and fume may be drawn from said chamber into said base member.

8. The laser work station in accordance with claim 7 wherein said side wall of said cart has sealing means about said port therein for effecting a seal between said sidewall of said base member and said side wall of said cart.

9. The laser work station in accordance with claim 8 wherein said base member has a pair of said ports therein alignable with ports of a pair of carts disposed in said work station.

10. The laser work station in accordance with claim 8 wherein said base member includes shutter means for selectively closing said ports.

11. The laser work station in accordance with claim 10 wherein there is included means for opening and closing said shutter means.

12. The laser work station in accordance with claim 1 wherein said cart has a base wall and side walls providing an upwardly opening chamber, and a grid across the top thereof for seating a workpiece.

13. The laser work station in accordance with claim 12 wherein said grid is removable.

14. The laser work station in accordance with claim 12 wherein said cart includes aligning means for positioning an associated workpiece placed thereon.

15. The laser work station in accordance with claim 12 wherein one of said side walls of said cart includes a clean out port for removing slag from said chamber.

16. The laser work station in accordance with claim 12 wherein said cart has first engaging means at its forward end and second engaging means at its rearward end, said engaging means being cooperatively configured and dimensioned to enable stable engagement and positioning of a pair of carts in front to rear relationship.

17. The laser work station in accordance with claim 1 wherein said laser head support carriage includes a depending positioning element engageable with a cooperating element on said cart whereby said laser head support carriage will move with said cart from one position to another within said work station to facilitate realignment of said guidance system relative to the workpiece when it is moved within said work station.

18. The laser work station in accordance with claim 1 wherein said position detecting means is supported on said laser head and operable to detect reference points on a workpiece moved by said cart from one position to another within said work station, said position detecting means cooperating with said guidance system to effect realignment of said guidance system upon such movement.

19. The laser work station in accordance with claim 1 wherein said work station includes a computer for controlling said movement means and said guidance system.

20. A laser work station comprising:
(a) a a pair of spaced, parallel extending elongated base members defining a work station therebetween, said par of base members having opposed side walls;
(b) a laser head support carriage extending between and mounted on said base members for movement along the length thereof;
(c) movement means for moving said laser head support carriage along the length of said base members;
(d) a laser head mounting assembly on said laser support carriage movable therealong between said base members;
(e) movement means for moving said mounting assembly along said laser head support carriage;
(f) a laser head on said mounting assembly mounted for movement vertically relative to said support carriage;
(g) movement means for moving said laser head vertically, said laser head thereby being movable vertically (Z axis), movable along said laser support carriage (Y axis), and movable with said laser support carriage along said base members (X axis);

(h) at least one self-supporting cart movable in a path between said base members and parallel thereto from a point of entry at one end of said base members to the opposite end thereof, said cart having a workpiece supporting surface on the top thereof, a base wall and side walls providing an upwardly opening chamber, san a guide across the top thereof for seating a workpiece, and said cart having wheels thereon and being readily removable from said work station to a remote position, one of said base members having at least one port along its opposed side wall adjacent said cart and suction means for drawing air through said port, the side wall of said cart adjacent said port having a port therein aligned therewith, whereby air and fume may be drawn from said chamber into said base member;

(i) guide means for guiding said cart between said base members for movement along said parallel path thereto;

(j) cart positioning means along said path for locating said cart in a predetermined position between said base members with said ports in registry;

(k) a guidance system connected to said several movement means for said laser support carriage, mounting assembly and laser head, for effecting precision movement of said laser head in said X, Y and Z axes to permit said base head to direct a laser beam onto an associated workpiece supported on said cart over substantially the entire length of said movement of said laser support carriage; and (l) a computer for controlling said movement means and said guidance system.

21. The laser work station in accordance with claim 20 wherein said cart positioning means includes a first positioning element on said cart and a second positioning element at a fixed location along the length of one of said base members, said first and second positioning elements cooperating to position said cart at a predetermined point along the length of the path between said base members.

22. The laser work station in accordance with claim 20 wherein said side wall of said cart has sealing means about said port therein for effecting a seal between said side wall of said base member and said side wall of said cart.

23. The laser work station in accordance with claim 22 wherein said base member has a pair of said ports therein alignable with ports of a pair of carts disposed in said work station, and wherein said base member also includes shutter means for closing said ports and means for opening and closing said shutter means.

24. The laser work station in accordance with claim 20 wherein said grid is removable, and wherein said cart includes aligning means for positioning an associated workpiece placed thereon.

25. The laser work station in accordance with claim 24 wherein one of said side walls of said cart includes a clean out port for removing slag from said chamber, and wherein said cart has first engaging means at its forward end and second engaging means at its rearward end, said engaging means being cooperatively configured and dimensioned to enable stable engagement and positioning of a pair of carts in front to rear relationship.

26. The laser work station in accordance with claim 20 wherein said laser head support carriage includes a depending positioning element engageable with a cooperating element on said cart whereby said carriage will move with said cart from one position to another within said work station to facilitate realignment of said guidance system relative to the workpiece when it is moved within said work station.

27. The laser work station in accordance with claim 20 wherein said laser head support carriage includes position detecting means operable to detect reference points on a workpiece moved by said cart from one position to another within said work station, said position detecting means cooperating with said guidance system to effect realignment of said guidance system upon such movement.

28. The laser work station in accordance with claim 1 wherein said cart is movable through said base members and outwardly of the other end thereof.

29. The laser work station in accordance with claim 1 wherein said laser head is mounted by said mounting assembly for movement vertically relative to said support carriage along a Z-axis and movement means is provided for effecting said vertical movement, is guidance system also effecting controlled movement of said laser head in said Z-axis.

30. A laser work station comprising:
(a) an elongated base member;
(b) a laser head support carriage mounted on said base member for movement along the length thereof;
(c) movement means for moving said laser head support carriage along the length of said base member;
(d) a laser head mounting assembly on said laser head support carriage movable therealong;
(e) movement means for moving said mounting assembly along said laser head support carriage;
(f) a laser head on said mounting assembly movable along said laser head support (Y axis), and movable with said laser head support carriage along said base member (X axis);
(g) at least one workpiece carrier movable in a path along said base member and parallel thereto, said carrier having a workpiece supporting surface on the top thereof;
(h) a guidance system connected to said several movement means for said laser head support carriage, and mounting assembly for effecting precision movement of said laser head in said X and Y axes to permit said laser head to direct a laser beam onto an associated workpiece supported on said carrier over substantially the entire length of said movement of said laser head support carriage; and
(i) at least one positioning element on said laser head support carriage and a cooperating element on said carrier engageable therewith, and means of moving said elements into engagement, whereby said carriage will move said carrier from one position to another within said work station.

31. The laser work station in accordance with claim 30 wherein said positioning element is a vertically movable rod engageable in a cooperatively configured recess in said carrier.

32. The laser work station in accordance with claim 31 wherein a spaced pair of positioning elements is provided to seat in recesses on opposite sides of said carrier.

33. A laser work station comprising:
(a) an elongated base member;
(b) a laser head support carriage mounted on said base member for movement along the length thereof;
(c) movement means for moving said laser head support carriage along the length of said base member;

(d) a laser head mounting assembly on said laser head support carriage and movable therealong;

(e) movement means for moving said mounting assembly along said laser head support carriage;

(f) a laser head on said mounting assembly for movement vertically relative to said support carriage;

(g) movement means for moving said laser head vertically, said laser head thereby being movable vertically (Z axis), movable along said laser head support carriage (Y axis), and movable with said laser head support carriage along said base member (X axis);

(h) at least one workpiece carrier movable in a path along said base member, said workpiece carrier having a workpiece supporting surface on the top thereof;

(i) a guidance system connected to said several movement means for said laser head support carriage, mounting assembly and laser head for effecting precision movement of said laser head in said X, Y and Z axes to permit said laser head to direct a laser beam onto an associated workpiece supported on said carrier over substantially the entire length of said movement of said laser head support carriage; and (j) position detecting means on said laser head operable to detect reference points on a workpiece on said carrier to effect alignment of said guidance system to correspond with the position of the workpiece on said carrier as determined from said reference points.

34. The laser work station in accordance with claim 33 wherein said detecting means is movable vertically with said laser head and senses reference contours on the workpiece.

35. A laser work station comprising:
(a) an elongated base member;
(b) a laser head support carriage mounted on said base member for movement along the length thereof;
(c) movement means for moving said laser head support carriage along the length of said base member;
(d) a laser head mounting assembly on said laser head support carriage movable therealong on said base member;
(e) movement means for moving said mounting assembly along said laser head support carriage;
(f) a laser head on said mounting assembly movable along said laser head support carriage (Y axis), and movable with said laser had support carriage along said base members (X axis); and
(g) at least one cart movable in a path along said base member, said cart having a workpiece supporting surface on the top thereof, a base wall and side walls providing an upwardly opening chamber, and a rid across the top thereof for seating a workpiece, said base member having at least one pot along its side wall adjacent said cart and suction means of drawing air through said port, the side wall of said cart adjacent said first mentioned port having a port therein aligned therewith, whereby air and fume may be drawn from said chamber into said base member.

36. The laser work station in accordance with claim 35 wherein said side wall of said cart has sealing means about said port therein for effecting a seal between said side wall of said base member and said side wall of said cart.

37. The laser work station in accordance with claim 36 wherein said base member has a pair of said ports therein alignable with ports of a pair of carts disposed in said work station, and wherein said base member also includes shutter means for closing said ports and means for opening and closing said shutter mans.

38. The laser work station in accordance the claim 35 wherein said grid is removable, and wherein said cart includes aligning means for positioning an associated workpiece placed on said grid.

39. The laser work station in accordance with claim 36 wherein one of said side walls of said cart includes a clean out port for removing slag from said chamber, and wherein said cart has first engaging means at its forward end and second engaging means at its rearward and, said engaging means being cooperatively configured and dimensioned to enable stable engagement and positioning of a pair of carts in front to rear relationship.

* * * * *

UNITED STATES PATENT AND TRADEMARK OFFICE
CERTIFICATE OF CORRECTION

PATENT NO. : 5,132,510

DATED : July 21, 1992

INVENTOR(S) : Hans Klingel and Friedrich Kilian

It is certified that error appears in the above-identified patent and that said Letters Patent is hereby corrected as shown below:

Column 8, line 67, delete "caret" and insert --cart--.

Column 9, line 5, delete "art" and insert --cart--; line 9, delete "or" and insert --for--; line 24, delete "racks" and insert --tracks--; line 31, delete 'interchangeable" and insert --interengageable--; line 50, after 'members", insert --comprises--.

Column 10, line 26, after "wherein", insert --said positioning means on--; line 48, delete "par" and insert --pair--.

UNITED STATES PATENT AND TRADEMARK OFFICE
CERTIFICATE OF CORRECTION

PATENT NO. : 5,132,510

DATED : July 21, 1992

INVENTOR(S) : Hans Klingel and Friedrich Kilian

It is certified that error appears in the above-identified patent and that said Letters Patent is hereby corrected as shown below:

Column 11, line 7, delete "san a guide" and insert --and a grid--.

Column 12, line 20, delete "is" and insert --said--; line 34, after "support", insert --carriage--.

Column 14, line 8, delete "had" and insert --head--; line 14, delete "rid" and insert --grid--; line 15, delete "pot" and insert --port--; line 32, delete "mans" and insert --means--; line 42, delete "and" (second occurrence) and insert --end--.

Signed and Sealed this

Sixteenth Day of November, 1993

BRUCE LEHMAN

*Attest:*

*Attesting Officer*         *Commissioner of Patents and Trademarks*